Figure 1:
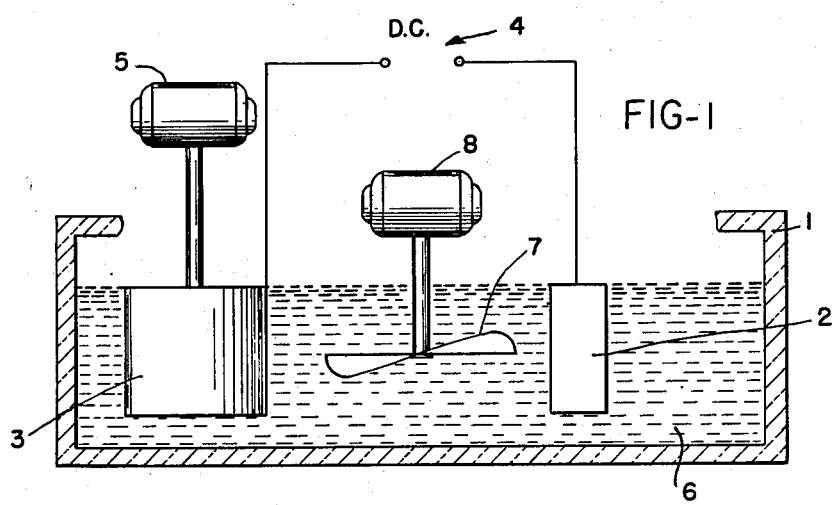

April 27, 1954   P. PAWLYK   2,676,918
FORMATION OF WRINKLING OILS BY POLYMERIZING
NONWRINKLING BASES
Filed Feb. 1, 1951

INVENTOR
PETER PAWLYK

BY

ATTORNEYS

Patented Apr. 27, 1954

2,676,918

UNITED STATES PATENT OFFICE 2,676,918

FORMATION OF WRINKLING OILS BY POLYMERIZING NONWRINKLING BASES

Peter Pawlyk, Dayton, Ohio, assignor to New Wrinkle, Inc., Dayton, Ohio, a corporation of Delaware Application February 1, 1951, Serial No. 208,960

9 Claims. (Cl. 204—79)

This invention relates to bodied oils. More particularly, the invention relates to bodied oils of the type utilized in the formation of wrinkle film compositions and to a method of producing such oils.

Certain oils possess to varying degrees the property of wrinkling with drier and forming with admixed resins wrinkle coating compositions. Such oils are, for example, tung oil, castor oil, oiticica oil, linseed oil, and soya bean oil.

These oils are normally heat treated or heat bodied by cooking and blowing to raise the oil "body" or viscosity to render them satisfactory for use in the wrinkle coating composition. This bodying is believed to occur basically through oxidation and polymerization actions taking place in the heated oil, although condensation reactions and the formation of colloidal systems may also play a part.

Chemical structures of the oils which will permit the formation of three dimensional polymers are considered necessary to the process. Oils which undergo this process are mixed glycerides of saturated and unsaturated acids, and in some cases are of a high degree of conjugation which leads to the rapid drying of oils of this type.

The prime difficulty with present methods of the heat bodying of oils is that of control of the reaction. For example, when tung oil is heat bodied the reaction becomes exothermic at temperatures in excess of 540° F. and control of the process cannot be adequately maintained.

While methods utilizing polymerization and oxidation inhibitors have been developed to slow down the reactions, the techniques involved in such thermal methods are critical and require expert workmen. Even under these conditions the degree of bodying in the finished product cannot be accurately controlled, for bodying may continue after the addition of arresting agents and during the cooling of the oil. Further the purity of the product obtained by such methods is relatively low because of decomposition and charring which takes place during the thermal treatment.

It is an important object of this invention to provide a novel method for the bodying of oils which overcomes the defects of the above noted processes.

It is a particular object of this invention to provide a unique process for the conversion of drying oils which are normally non-wrinkling to wrinkling oils.

It is a primary object of this invention to provide a novel process for the bodying of oils which are particularly suitable for use in wrinkle coating compositions.

It is another important object of this invention to provide a novel process for the bodying of oils in which the degree of bodying or the viscosity may be readily controlled.

It is another object of this invention to provide a novel process for the incorporation of a drier into the hydrocarbon chain of the oil to form a carbon-metal linkage.

It is a further object of this invention to provide an improved bodied oil of uniform and predetermined characteristics.

It is still another object of this invention to provide a bodied oil having the drier incorporated therein.

These and other objects of the invention are attained by providing an electrolytic process for the bodying of the oils, a system to which the oils under consideration due to their conjugated bond structure readily lend themselves.

Thus in the process of invention an oil to be bodied is caused to react at the anode of an electrolytic cell and bodying takes place through the mechanisms of oxidation, polymerization and/or degradation. Since such reactions are not self sustaining at low temperatures reaction may be halted at any desired point, which point is determinable through a calculation of the electrical energy input required for the desired reaction. Standards for oils under consideration may be established and precise control further facilitated by periodic checking of the electrolyzed solution.

The anolyte or solution subjected to the electrolyzing current may consist generally of:

(a) the oil to be treated;
(b) a conductive salt;
(c) a catalyst; and
(d) a diluent as required.

In given instances a conductive salt may not be required if a sufficient potential is placed across the oil in order to break the same down so that it itself conducts. However, generally the use of a conductive salt is recommended in order that lower voltages may be effectively utilized. In these cases the conductive salts may consist of metallic resinates, linoleates, naphthenates, salts of fatty acids, resin soaps, alcoholates, and other organic and inorganic salts. Preferably resinates or linoleates of cobalt, lead or manganese are used as the conductive salts since these materials are catalysts used to produce a surface skin when the ultimate composition of the wrinkle coating is sprayed, that is, these materials are driers in the finished product.

It should be noted in connection with the use of conductive salts that two distinct methods may be employed, that is, the use of a conductive salt that is soluble in the "straight" or diluted oil, or the salt may be emulsified with the oil. Where the emulsion technique is employed inorganic salts, such as sodium carbonate, sodium acetate, and sodium sulfate, and also acids such as sulfuric and phosphoric, may be employed for the formation of the emulsion. Catalysts which are particularly suitable for electrolytic action are cerium, mangano, titanium salts, ferro-cyanides and chromates.

To speed up the electrolytic action heat may be employed to decrease the viscosity of the oil solution. This does not imply the use of temperatures comparable to those used in the bodying of oils by the present thermal method where temperatures of 400 or 500 degrees are common, but merely that the solution may be warmed to a temperature of 40 or 50 degrees centigrade, at which temperature no polymerization or oxidation takes place and consequently the control of the process is not affected thereby.

It may be noted that normally anode currents are in the range of .15 to 7.0 amps. per square decimeter of electrode area. Under the conditions noted the degree or oxidation or polymerization or reduction of the oil subjected to the current flow may be readily controlled by controlling the current density.

Thus it is possible with the method of this invention to select a particularly desired end product having specific characteristics. To facilitate such selection the reaction product in the electrolytic cell may be kept separate by the use of a porous diaphragm or careful selection of electrode size.

Figure 2:
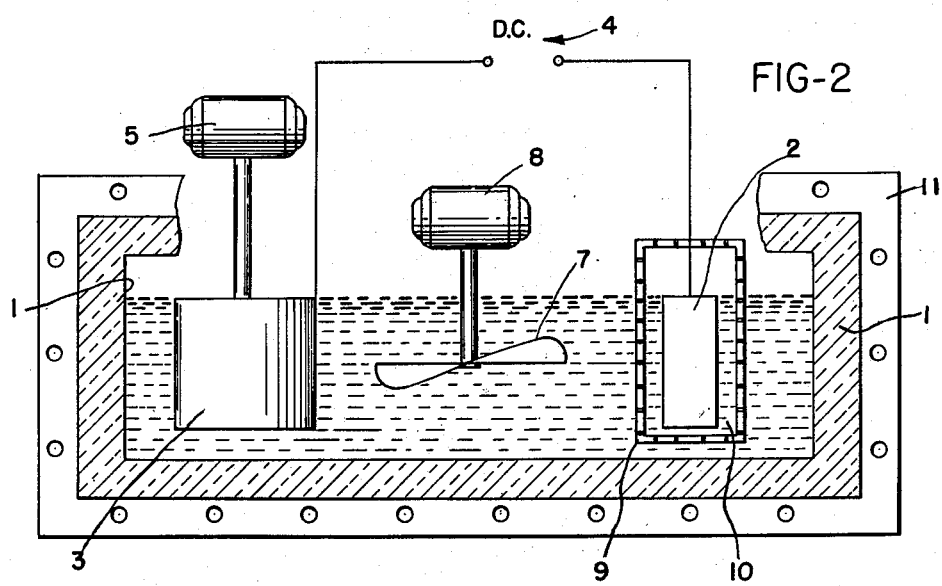

The nature and purpose of this invention has been indicated in a general way and there follows a more detailed description of the preferred embodiments thereof with reference to the accompanying drawing in which:

Figure 1 is a diagrammatic view of the apparatus utilized in carrying out one embodiment of the invention; and Figure 2 is a view of apparatus suitable for a further embodiment of the invention.

Referring to Figure 1, there is shown a container 1 of any suitable electrically non-conductive material provided with a cathode 2 and an anode 3. The cathode and anode are connected to a source of direct current 4, the anode being electrically connected by a sliding contact in a manner well known to the art and the anode may accordingly be rotatably driven by a motor indicated at 5. The anode 3 is preferably a circular gauze structure in order to permit ready selection of the ratio of the anode-cathode area. To prevent reaction of anode products with the cathode, it is desirable that this ratio be maintained high, i. e., about 10:1, although ratios of 100:1 may be suitably employed.

The solution under treatment is designated generally at 6 and a stirrer 7 actuated by a motor 8 is employed in conjunction with the rotating anode to agitate the solution and provide for intimate contact with the anode surface.

The structure shown in Figure 2 is similar to that set forth in Figure 1 except the cathode is here provided with a cylindrical porous diaphragm 9 forming a compartment 10 about the cathode, the diaphragm 9 being provided with a removable top or suitable opening for insertion of the cathode. Also the cell in this instance is provided with a heating jacket 11. As noted hereinbefore the jacket 11 is adapted to raise the temperature of the solution to about 40 to 50 degrees centigrade, which warming facilitates the conductivity of the solution but does not induce polymerization nor affect control of the process.

The following examples are typical of the conditions under which the process of this invention is carried out:

*Example I*

100 grams of tung oil of H viscosity on the Gardner Humboldt scale dissolved in 50 grams of a solution containing 80 percent toluene and 20 percent ethyl alcohol, together with 10 cc. of 6 normal acetic acid, were utilized as the electrolyte.

The temperature of this solution was raised to about 40 degrees centigrade, and the solution employed in a bath having an anode of lead and a cathode of nickel, the anode-cathode area being about 50:1.

A current having an anode current density of 0.80 to 3.28 amps. per square decimeter was passed through the solution and the reaction allowed to continue until the desired viscosity was obtained.

Starting with raw tung oil and utilizing a current density of about 3.28 amps. per square decimeter, a satisfactory bodied oil of T viscosity was obtained in 40 minutes, while approximately 160 minutes were required at 0.80 amps. anode current density.

*Example II*

In this instance 100 grams of tung oil of H viscosity on the Gardner Humboldt scale were mixed with 10 grams of sulfonated toluene and placed in the anode compartment of the structure shown in Figure 2. The anode in this instance was pure lead.

To the cathode compartment a 10% solution of sodium hydroxide was added and an anode current density of about 0.6 to 3.28 amps. per square decimeter was applied to the electrolyte.

The tung oil in this instance was bodied to a satisfactory degree of a W viscosity in from about 50 minutes to 200 minutes, which times are related directly to the current density limits set out above.

*Example III*

100 grams of raw tung oil were mixed with 50 grams of toluol and about 0.1 to 0.5 gram of naphthenate of cobalt added to the solution.

This solution was then placed in the anode compartment of the structure shown in Figure 2 wherein the anode itself is lead peroxide.

The cathode compartment was provided with a solution of about 5 percent sulfuric acid, the cathode electrode being carbon.

The temperature of the solution was raised to between about 40 to 50 degrees centigrade, and an anode current density of 0.25 to 1.5 amps. per square decimeter passed through the solution.

The resultant product in this instance contains the desired drier components. The time of preparation was about the same as in the previous instances.

*Example IV*

An anolyte solution containing 100 grams of castor oil and 50 grams of toluene, and a conductive salt to the extent of about .12 gram of cobalt $(CH_2-CH=CH_2)_2$ were added to the anode compartment.

The positive electrode in this instance comprised a bagged carbon anode. The cathode contained 2.5 percent sulfuric acid. A current density of 0.2 to 1.0 amp. per square decimeter was passed through the solution, which was warmed to a temperature of about 40 degrees until the desired product was obtained.

*Example V*

An anolyte comprising 100 grams of linseed oil was stirred together with 0.50 gram of cerium sulfate in 10 cc. of 10% sulfuric acid solution to form an emulsion.

This solution was placed in an anode compartment which anode was of lead. A cathode of 10% sulfuric acid was placed in the cathode compartment, which electrode was also of lead.

An anode current density of 0.15 to 1.8 amps. per square decimeter was then passed through the solution at a temperature of from 40 to 50 degrees until the desired polymerized product was obtained.

From the foregoing examples, it is clear that the invention is not limited to the particular type of electrolyte used, electrode materials, or the media in which the reaction was carried forward. For example, I may form a true solution of the different oils, or suspend them in conductive media, or I may form emulsions and suspend current carrying compounds in the reacted mass. Nor am I limited in the type of current carrier added, but prefer to use such compounds as will activate the reaction and permit the introduction of materials to serve as driers. Further, the reaction may be carried out in acid alkali or neutral media, whichever will achieve the best results in a given instance.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

I claim:

1. A process for the bodying of tung oil comprising the steps of mixing together tung oil, a metallic drier component and sulfonated toluene to form an anolyte, forming a catholyte of sodium hydroxide and water, and passing an electric current through the said anolyte and catholyte until the desired oil viscosity is attained.

2. A process for the bodying of drying oils for wrinkle coating compositions comprising the step of passing an electric current through an anolyte comprising said oil, an organic diluent therefor, and a conductive metal salt, until the desired oil viscosity is attained.

3. A process for the bodying of drying oils for wrinkle coating compositions comprising the step of passing an electric current through an anolyte comprising said oil, an organic diluent therefor, and a metallic drier component, until the desired oil viscosity is attained.

4. A process for the bodying of tung oil for use in wrinkle coating compositions which comprises passing an electric current through an anolyte comprising raw tung oil, an organic diluent therefor, and naphthenate of cobalt drier, until the desired oil viscosity is attained.

5. A process for the bodying of tung oil for use in wrinkle coating compositions which comprises passing an electric current through an anolyte comprising raw tung oil, an organic diluent for the oil, and naphthenate of cobalt drier, and through a catholyte comprising a 5% aqueous solution of sulfuric acid, until the desired oil viscosity is attained.

6. A process for the bodying of tung oil for use in wrinkle coating compositions which comprises passing an electric current through an anolyte comprising raw tung oil, toluol as a diluent for the oil, and naphthenate of cobalt drier, and through a catholyte comprising a 5% aqueous solution of sulfuric acid, until the desired oil viscosity is attained.

7. A process for the bodying of castor oil for use in wrinkle coating compositions which comprises passing an electric current through an anolyte comprising castor oil, an organic diluent for the oil, and cobalt $[CH_2-CH=CH_2]_2$, until the desired oil viscosity is attained.

8. A process for the bodying of castor oil for use in wrinkle coating compositions which comprises passing an electric current through an anolyte comprising castor oil, a diluent therefor, and cobalt $[CH_2-CH=CH_2]_2$, and through a catholyte comprising an aqueous 2.5% sulfuric acid solution, until the desired oil viscosity is attained.

9. A process for the bodying of castor oil for use in wrinkle coating compositions which comprises passing an electric current through an anolyte comprising castor oil, toluol as diluent for the oil, and cobalt $[CH_2-CH=CH_2]_2$, and through a catholyte comprising an aqueous 2.5% sulfuric acid solution, until the desired oil viscosity is attained.

References Cited in the file of this patent

UNITED STATES PATENTS

| Number | Name | Date |
|---|---|---|
| 373,691 | Schwahn | Nov. 22, 1887 |
| 501,578 | Pfanne | July 18, 1893 |
| 1,577,426 | Schuricht et al. | Mar. 16, 1926 |
| 2,084,137 | Geiger et al. | June 15, 1937 |
| 2,133,889 | Bonney et al. | Oct. 18, 1938 |